United States Patent
Chan et al.

(10) Patent No.: US 6,631,101 B1
(45) Date of Patent: Oct. 7, 2003

(54) SYSTEM, METHOD, AND SOFTWARE FOR RECOVERING FROM INTERRUPTION OF DVD PLAYBACK

(75) Inventors: Rix S. Chan, Dakota Dunes, SD (US); George Watchorn, Ponca, NE (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/270,420

(22) Filed: Mar. 16, 1999

(51) Int. Cl.[7] ............................................... G11B 21/08
(52) U.S. Cl. .................................. 369/30.36; 369/30.24
(58) Field of Search ........................... 369/32, 33–275.3, 369/53.2, 47.1, 47.15, 18, 30.03, 30.24, 30.36, 30.23, 53.22, 30.27, 30.29, 30.11, 30.21; 386/126

(56) References Cited

U.S. PATENT DOCUMENTS

| | | | | |
|---|---|---|---|---|
| 4,262,301 A | | 4/1981 | Erlichman | 358/6 |
| 4,779,252 A | | 10/1988 | Custers et al. | 369/32 |
| 4,852,073 A | | 7/1989 | Shinohara et al. | 369/12 |
| 4,855,842 A | | 8/1989 | Hayes et al. | 358/342 |
| 4,996,679 A | | 2/1991 | Yoshio | 369/33 |
| 5,093,731 A | | 3/1992 | Watanabe et al. | 358/335 |
| RE34,475 E | | 12/1993 | Custers et al. | 369/32 |
| 5,365,502 A | * | 11/1994 | Misono | 369/18 |
| 5,465,240 A | | 11/1995 | Mankovitz | 369/1 |
| 5,506,821 A | | 4/1996 | Burton, Jr. | 369/32 |
| 5,617,384 A | | 4/1997 | Yonemitsu et al. | 369/32 |
| 5,638,346 A | * | 6/1997 | Aramaki | 369/32 |
| 5,691,972 A | | 11/1997 | Tsuga et al. | 369/275.3 |
| 5,740,143 A | * | 4/1998 | Suetomi | 369/60 |
| 5,831,946 A | * | 11/1998 | Bie | 369/30.36 |
| 5,889,745 A | * | 3/1999 | Aramaki | 369/58 |
| 6,088,304 A | * | 7/2000 | Aramaki et al. | 369/32 |
| 6,104,678 A | * | 8/2000 | Matsumoto et al. | 369/33 |
| 6,188,650 B1 | * | 2/2001 | Hamada et al. | 369/30.36 |
| 6,388,961 B1 | * | 5/2002 | Ijichi | 369/30.36 |
| 6,396,777 B1 | * | 5/2002 | Thomas | 369/30.24 |
| 6,430,122 B1 | * | 8/2002 | Hamada et al. | 369/30.36 |

* cited by examiner

*Primary Examiner*—Ali Neyzari
(74) *Attorney, Agent, or Firm*—Scott Charles Richardson; Eduardo E. Drake; Schwegman Lundberg Woessner & Kluth

(57) ABSTRACT

Battery-powered computer systems have evolved into multimedia systems which can playback two-hour movies stored on Digital Versatile Disks (DVDs). However, battery lives are generally too short to permit users to view an entire movie without interruption, requiring users who resume playback to fast-forward to an approximate point where the interruption occurred. Accordingly, the present invention provides system, method, and software embodiments which monitor battery status during DVD playback, and upon detection of low battery level, record a current playback position. Subsequent to the replacement or recharge of the battery, playback may be automatically resumed at the recorded playback position, thereby saving both time and power in recovering from the interruption. Other embodiments omit battery monitoring by periodically recording playback position and facilitate recovery from interruptions of data-transfer operations.

30 Claims, 4 Drawing Sheets

SYSTEM, METHOD, AND SOFTWARE FOR RECOVERING FROM INTERRUPTION OF DVD PLAYBACK

BACKGROUND

The present invention concerns data-management systems, particularly battery-powered computer systems that include optical-disc drives.

In recent years, computer systems have evolved into multi-media systems replete with fantastically fast microprocessors, color graphic displays, and stereo speakers. These systems also typically include an optical-disk drive for reading optical disks bearing digital data representative of text, audio, and video information. Although these drives typically read compact-disk-read-only-memories (CD-ROMs), the drives in more advanced systems additionally read digital-versatile-disk ROMs, otherwise known as DVD-ROMs or DVDs for short. A single DVD stores about 5 billion bytes of data, which is approximately seven times more data than a CD-ROM stores. (A byte is 8 bits, and a bit is a one or a zero.) This greater storage capacity enables a single DVD to store an entire two-hour movie.

Today, even portable computer systems, such as laptop and notebook computers, offer these multi-media capabilities. Some of these portable systems, which are battery-powered, even include drives that read DVDs, enabling users to watch DVD movies anywhere they can take their computers.

However, watching a complete two-hour movie on a battery-powered computer has at least one troublesome drawback: The battery packs in most of these portable systems run out of power before completion of the movie. When this happens, the typical procedure for resuming playback is to recharge or replace a battery pack, restart DVD playback at the beginning, and fast-forward to the approximate position where playback was interrupted. Unfortunately, fast-forwarding to this position is not only inconvenient but wastes time and battery power. Therefore, there is a need for a convenient DVD playback system and method that avoids wasting-time and power when resuming play after interruption.

SUMMARY OF THE INVENTION

To address these and other needs, the present invention provides a method, software, and a system which records playback position data before a playback interruption and then allows resumption of playback at the recorded playback position. Thus, the present invention saves the time and power that conventional systems would require for the resumption of playback after an interruption.

In one embodiment, recorded playback position refers to a specific portion of an optical disk, and in other embodiments it refers more generally to an address or region of any data-storage medium. Thus, the invention provides fast and efficient recovery for interruptions of both DVD movie playback and general data-transfer operations. Other embodiments, aspects, and advantages of the invention will become apparent after considering the accompanying drawings and the following detailed description.

DESCRIPTION OF THE PREFERRED EMBODIMENTS OF THE INVENTION

The following detailed description, which references and incorporates FIGS. 1–4, describes and illustrates specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1A:
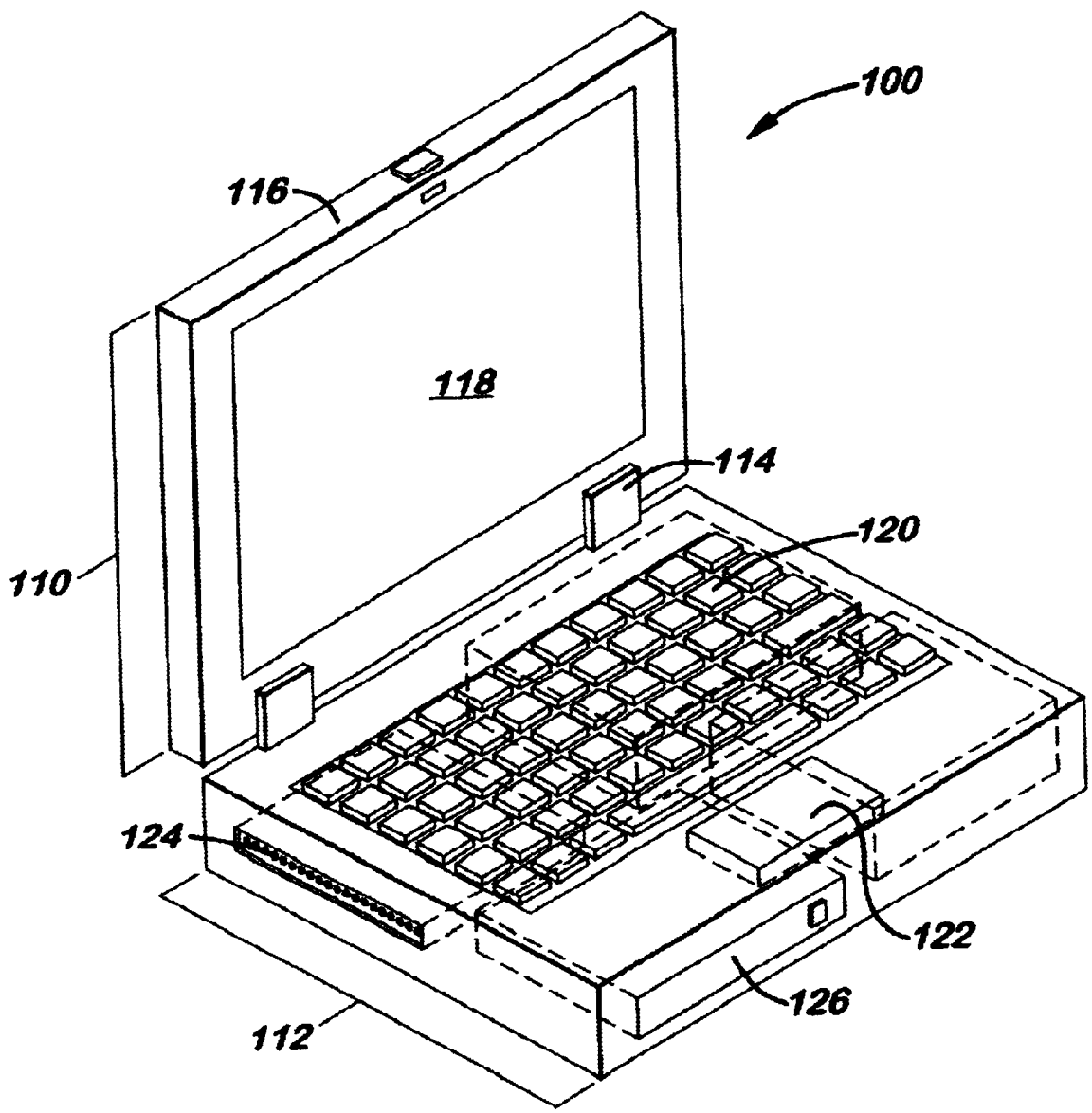
FIG. 1A is a perspective view of a portable computer system incorporating the invention.

FIG. 1A shows perspective view of a portable multimedia computer system 100, which incorporates the present invention. System 100 includes an upper chassis 110 and a lower chassis 112 connected via hinge 114. Upper chassis 110 has an integral bezel 116, which encompasses a display 118. Hinge 114 allows adjustment of the view angle of display 118 and closure of upper chassis 110 on lower chassis 112. Among its visible features, lower chassis 112 includes a keyboard 120, a touch-pad 122, a floppy-disk drive 124, and an optical-disk drive 126. Lower chassis 112 also includes other conventional features, such as speakers, printer ports, AC-adapter connection, pointing-device connection, external speaker jacks, head-phone jacks, telephone jacks, and so forth, which are not visible in FIG. 1.

Figure 1B:
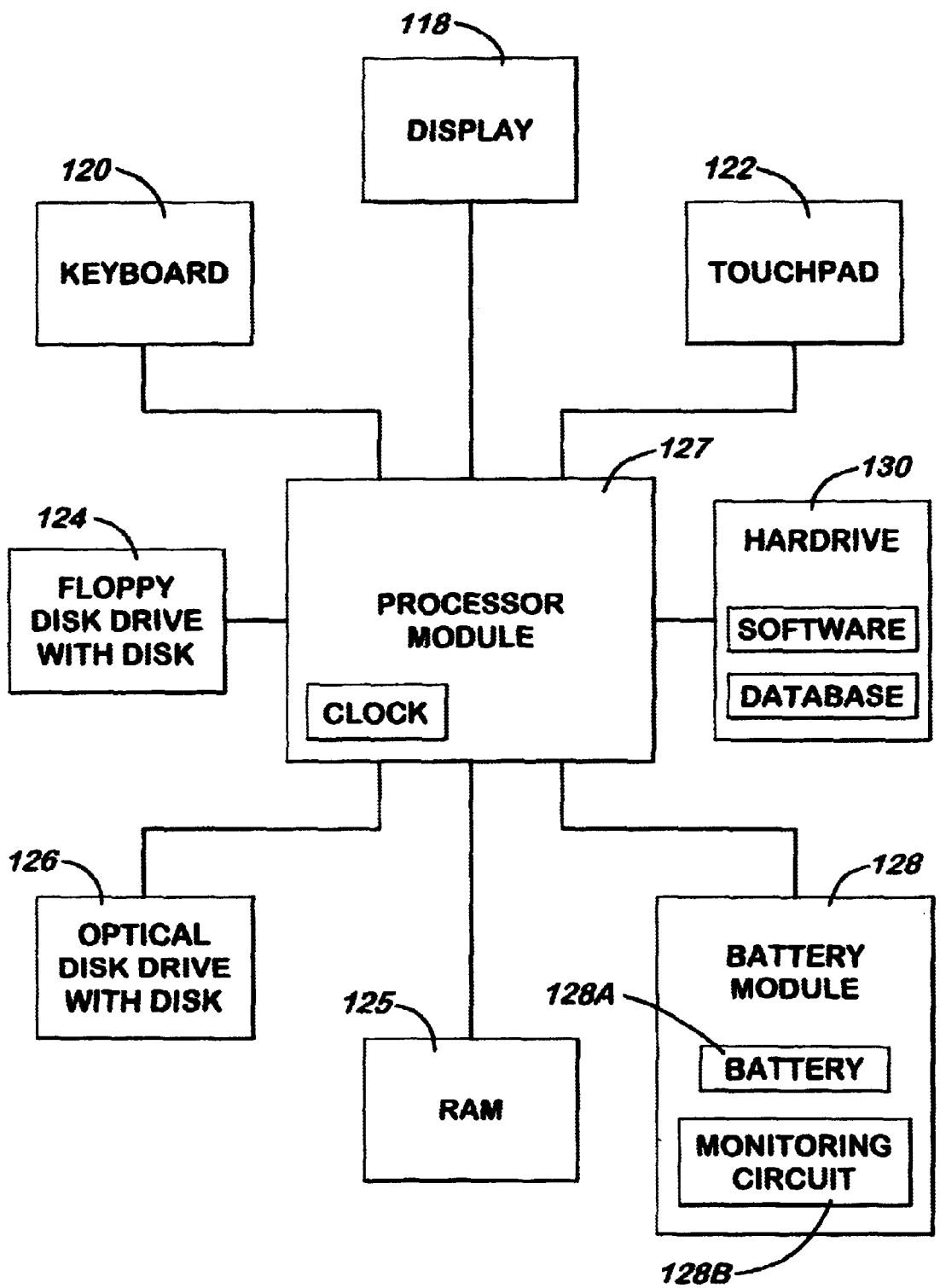
FIG. 1B is a block diagram further illustrating the computer system shown in FIG. 1A.
Figure 2:
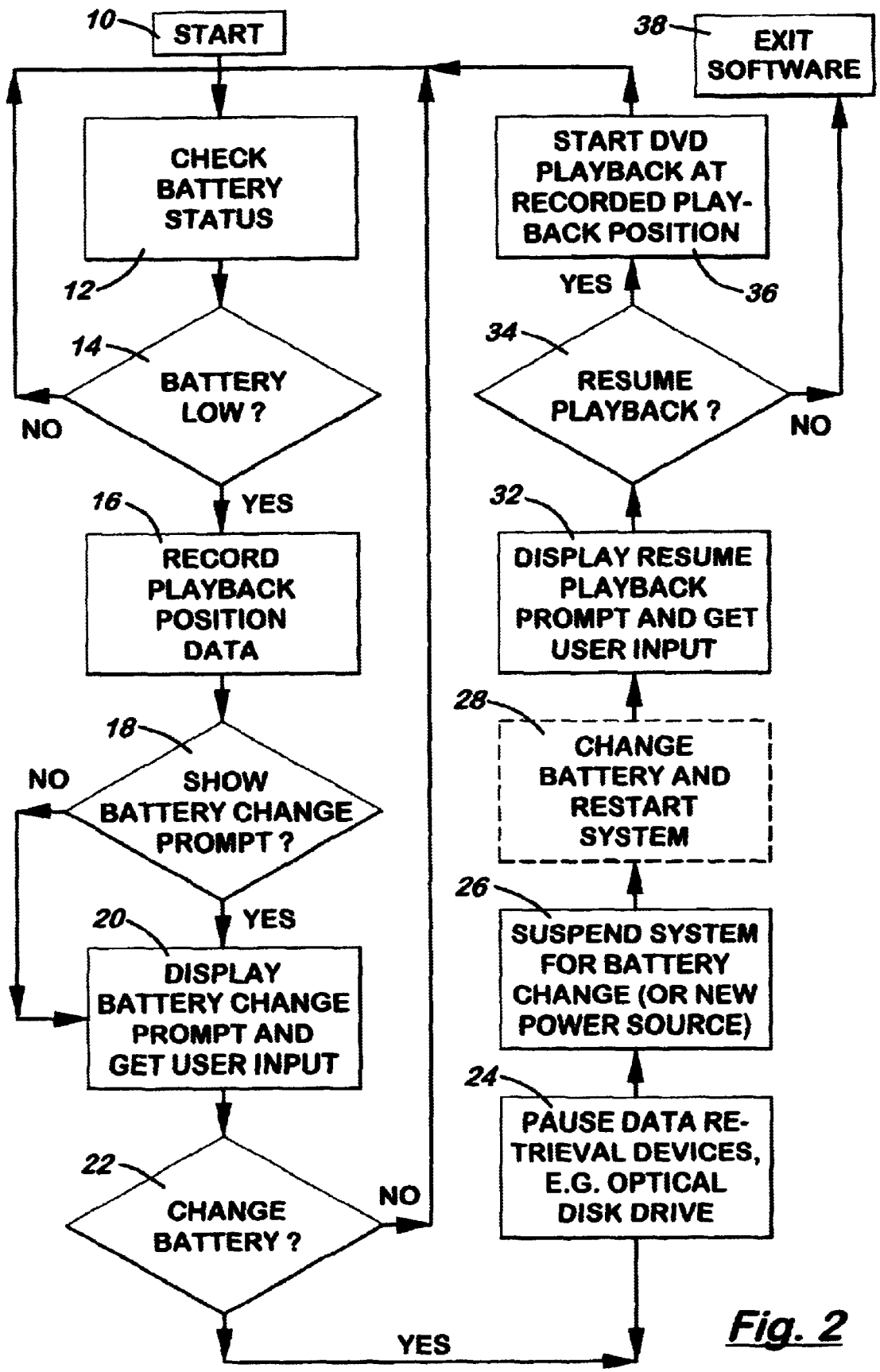
FIG. 2 is a flowchart of a method incorporating the invention.

FIG. 1B is a functional block diagram of computer system 100, showing functional modules most relevant to the invention. (For clarity, the diagram omits other conventional modules.) At the heart of computer system 100 is a processor module 127, which includes system clock 127a. Processor module 127 cooperates with display 118, keyboard 120, touch pad 122, floppy-disk drive (with disk) 124, random-access-memory (RAM) module 125, optical-disk drive (with disk) 126, battery module 128, and hard drive 130, using an operating system. The preferred operating system is Microsoft Windows 95, which provides a multitude of functions, including a graphical user interface and a power management system.

Battery module 128 includes a removable and rechargeable battery pack 128a and a battery-monitoring circuit 128b. Battery pack 128a is generally sufficient to operate system 100 for 3–4 hours under normal use. Battery-monitoring circuit 128b, a conventional circuit, provides battery status information to processor 128 via the power management system. Hard drive 130 includes playback-indexing software 130a and playback-index database 130b.

With the exception of software 130a and database 130b, the features mentioned thus far are available on many commercially available portable computer systems. The preferred embodiment places software 130a and database 130b on the Solo™9100XL portable computer system from Gateway 2000, Inc. of North Sioux City, S.Dak. In this preferred embodiment, display 118 is a 14.1-inch, XGA active-matrix-color display; processor 127 is a 266-MHZ Pentium processor with MMX Technology; battery pack 128a includes a twelve-cell, lithium-ion, 60-watt-hour battery; hard drive 122 has a 2.1-gigabyte capacity; floppy-disk drive 124 is a conventional 3.5-inch drive, and optical-disk drive 126 reads DVD-ROMs, CDS, and CD-ROMs. The owners manual for the Solo™9100 XL portable computer system is incorporated herein by reference.

In operation, system 100 preferably executes playback-indexing software 130a whenever optical-disk drive 126 is called upon to read, or play, a disk. However, in other embodiments, the system executes software 130a only when it senses that the disk in drive 126 contains a DVD movie. The general function of playback-indexing software 130a is to monitor the status of battery pack 128a and to record, or write, the playback position of the disk in playback-index database 130b upon detection of a low-battery level. Software 130a embodies a preferred method shown in the flowchart of FIG. 2.

In particular, the preferred method starts at block 10 which indicates that system 100 has been activated and that optical disk drive 126 is playing a disk. In the preferred embodiment, playing the disk, which contains a DVD movie, causes the system to display video and text information in at least a portion of display 118 and to output audio information from the DVD movie through built-in speakers, or through optional external speakers or headphones coupled to the system. However, in more general embodiments, block 10 indicates that a data transfer operation from one data-storage device to another, for example, from optical-disk drive 126 or another external data source to hard drive 130 or to floppy-disk drive 124, has been initiated.

In parallel with starting playback of the optical disk, the system executes step 12 which entails checking the system battery status, or in other embodiments any power status having a bearing on playback of the disk. In the preferred embodiment, this entails use of Windows Advanced Power Management (APM) commands to determine the status of the system battery. After getting the battery status, the system, at step 14, decides whether the battery status indicates a low battery. If no low battery is indicated, the system returns to step 12 to again check battery status. During this checking and rechecking, optical drive 126 continues to read and transfer data to appropriate display and audio drivers within computer system 100.

However, if a low-battery status is indicated, the system executes step 16. Step 16 entails getting and recording information that either directly or indirectly identifies a position or data address on the data-storage medium, that is, the disk, in optical-disk drive 126. In the preferred embodiment, the system accesses DVD real-time playback data indicating a DVD chapter and DVD elapsed play time, conventionally given in terms of hours, minutes, and seconds, using available Windows functions to interface with optical-disk drive 126. However, in embodiments that are concerned with other types of data-storage devices or data transfers, the system uses any suitable interface feature or function. After getting the position-indicating information, the system writes, or records, this information in playback-indexing database 130b.

Figure 3:
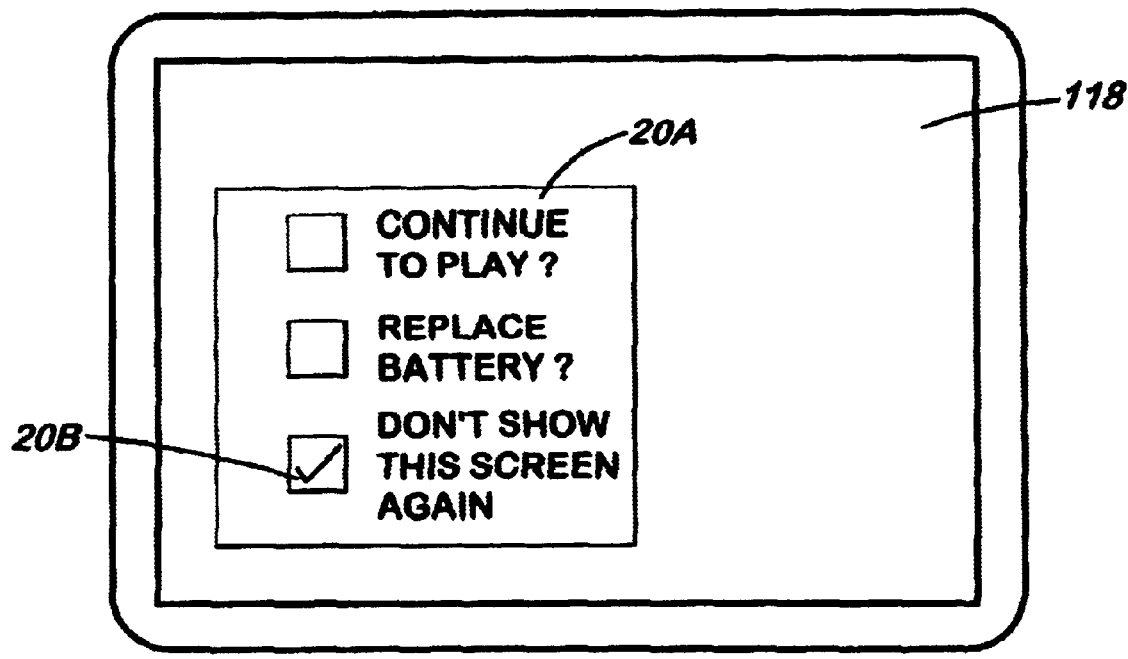
FIG. 3 is a facsimile of a dialog box associated with the flowchart of FIG. 2.

Next, at step 18, the system decides whether to prompt the user to replace the low battery. This entails checking whether a prompt flag, preferably stored in database 130b, has been set or reset. (This flag is initially set when the playback-indexing software is installed.) If it has been set, step 20 causes the system to display a dialogue box 20a on display 118, as shown in FIG. 3, with a message asking the user to select between two options: continuing to play, or read, the disk or pausing playback to allow replacement or recharge of the low battery pack 128a. Dialogue box 20a also includes a check-off input 20b which allows the user to set or reset the prompt flag.

If the prompt flag has been reset, the system skips ahead to step 22, where it checks whether the user wants to replace battery pack 120. If the user has opted not to replace the low battery pack, the system returns to step 12 to recheck the battery status, with optical-disk drive 126 continuing to playback the disk until the system ultimately shuts down from loss of sufficient battery power (or operations are otherwise terminated.)

If the user has opted to replace battery pack 128a (or connect to another power supply), the system proceeds to step 24. In step 24, the system pauses optical-disk drive 126 at its current playback position and then suspends system operation, according to conventional power management techniques, as indicated in step 26. Subsequently, the user replaces or recharges battery pack 128a or connects the system to another power supply, for example, an AC power outlet, before reactivating the system in step 28.

Figure 4:
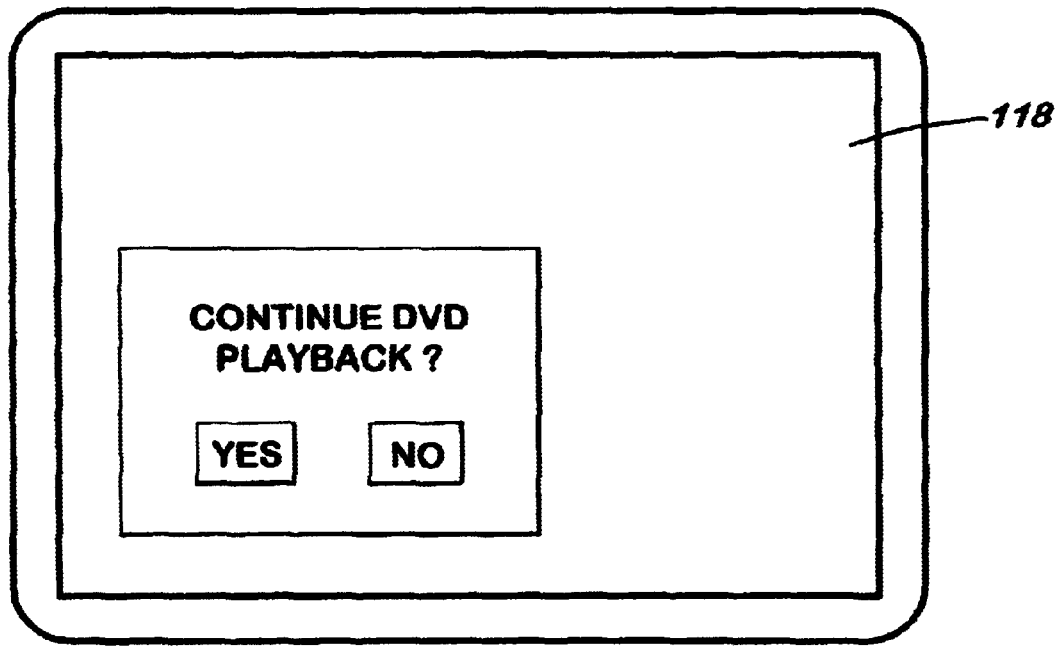
FIG. 4 is a facsimile of another dialog box associated with the flowchart of FIG. 2.

Upon reactivation, the system executes step 32, prompting the user to decide whether to continue playback of the optical disk via a dialogue box 32a. An example of dialog box 32a is shown in FIG. 4. If the user elects not to continue playback, the system exits playback-indexing software 130a, as shown at step 34. However, if the user elects to resume playback, the system executes step 36 which entails retrieving the playback position information (recorded at step 16) from playback-indexing database 130b and advancing optical-disk drive 126 to the position indicated in or based on the playback-position information. In other embodiments, the system executes step 36 immediately upon reactivation, under the assumption that the user wishes to continue the playback.

In any event, after resumption of playback, the system begins repeating steps 16 and 18, which entail checking battery status and deciding if the status is low. This continues until another low battery level is detected (or until completion of playback). Thus, playback-indexing software 130a and playback-indexing database 130b allows fast and efficient recovery from playback interruption.

Playback resumption in other embodiments entails verifying that the disk in optical-disc drive 126 is the same as that associated with the position information. If it is not, the system prompts the user with the name or other identifying information that may be used to communicate the identity of the corresponding disk to the user.

In another embodiment of the invention, the playback position data is recorded at fixed intervals, for example, every second or every minute, regardless of the battery status, with each successive recording of playback-position data overwriting a preceding one. Thus, if playback is interrupted for any reason, these other embodiments will allow resumption of playback from the last recorded playback position data. In a preferred version of this embodiment, there are at least two sets of playback-position data within database 130b: a previous set and a current set. Prior to overwriting the current set of playback position data, the system copies it to the previous set. Thus, if the system is unable to complete recording of the current playback-position information, it can still recover from playback interruption using the previous playback-position data.

In still other embodiments, the system, relying on clock 127a, records a start time and a playback-interruption time. Taking the difference between these two times, the system calculates an elapsed time which corresponds approximately to playback position at the playback interruption. Alternatively, the system can simply start a playback timer at the beginning of playback and stop the timer upon interruption of playback. Preferably, this timer is synchronized with playback pauses and rewinds to track actual forward playback.

Additionally, even though the preferred embodiment of the invention is presented in the context of a portable, battery-powered computer system, other embodiments of the invention include battery-powered and non-battery-powered set-top-type DVD players, which allow stand-alone operation with a conventional television. Furthermore, the invention can be readily applied to facilitate resumption of any data transfer operation subject to deliberate or inadvertent interruption.

For example, one embodiment of the invention invokes the playback-indexing software during a data download from the Internet into floppy-disk drive 124 or hard drive 130. Thus, if power were interrupted during the download, this embodiment of the invention would facilitate resumption of the download by recording an index used to avoid restarting the download from the beginning of the data.

Conclusion

The system, method, and software of the present invention solves the problem of quickly and efficiently resuming DVD playback in battery-powered computer systems. Resuming playback after battery failure conventionally requires recharging or replacing the battery, restarting DVD playback at the beginning, and then fast-forwarding to the approximate position where playback was interrupted. In contrast, preferred embodiments of the present invention monitor battery status during DVD playback, and upon detection of low battery level, record the current playback position. Thus, after battery replacement or recharge, playback may be automatically resumed at the recorded playback position, thereby saving both time and power in recovering from the interruption. Moreover, other embodiments of the invention omit battery monitoring. And still other embodiments facilitate recovery from interruptions of general data-transfer operations, not just DVD playback.

The embodiments described above are intended only to illustrate and teach one or more ways of practicing or implementing the present invention, not to restrict its breadth or scope. The actual scope of the invention, which encompasses all ways of practicing or implementing the invention, is defined only by the following claims and their equivalents.

What is claimed is:

1. A method of operating a computer system that includes an optical-disk drive, the method comprising:

playing a disk in the optical-disk drive;

recording information indicating a disk playback position; and resuming play of the disk at a disk position based on the disk playback position indicated in the recorded information, after an interruption of power to the optical-disc drive;

wherein the step of recording information is performed before an event leading to the interruption of power.

2. The method of claim 1 wherein recording information indicating a disk position includes recording information indicative of an elapsed playback time.

3. A method of operating a computer system that includes an optical-disk drive, the method comprising:

playing a disk in the optical-disk drive;

recording information indicating a disk playback position; and resuming play of the disk at a disk position based on the disk playback position indicated in the recorded information, after an interruption of power to the optical-disc drive;

wherein the interruption of power to the optical-disk drive occurs in response to a loss of sufficient battery power.

4. The method of claim 3 wherein resuming play of the disk at the recorded playback position comprises directing the optical-disk drive to go to the disk playback position indicated by the recorded information.

5. The method of claim 1:

wherein the optical-disk drive operates primarily on power from a battery pack;

wherein the interruption of power to the optical-disk drive occurs in response to loss of sufficient battery power; and wherein resuming play of the disk at the playback position occurs after replacing at least a portion of the battery pack, recharging at least a portion of the battery pack, or coupling the optical-disk drive to an AC power outlet.

6. The method of claim 1 wherein playing a disk in the optical-disk drive comprises playing a DVD-ROM in a DVD-ROM-compatible drive.

7. A computer-readable, data-storage medium that stores playback-indexing software comprising instructions for:

recording information indicative of a playback position of a data-retrieval device; and communicating a playback position based on the recorded information to the data-retrieval device;

wherein the step of communicating the playback position is performed after a power interruption to the data-retrieval device; and wherein the step of recording the information indicative of the playback position is performed before an event resulting in said power interruption to the data-retrieval device.

8. The computer-readable, data-storage medium of claim 7, wherein recording information indicative of a playback position occurs in response to a determination that a battery is low.

9. The computer-readable, data-storage medium of claim 7, wherein the data-retrieval device comprises at least one of an optical-disk drive, a floppy-disk drive, and a hard drive.

10. A computer system comprising:

a processor;

a display coupled to the processor;

an optical-disk drive for playing an optical disk, the optical-disk drive coupled to the processor for processing data from the optical disk and coupled to the display for displaying data from the optical disk;

means for determining, prior to a power interruption, information indicative of a playback position of the optical-disk drive; and a memory device which stores instructions for recording the information indicative of the playback position of the optical-disk drive and for directing the optical-disk drive to initiate, following the power interruption, a playback operation at a playback position based on the recorded information.

11. The system of claim 10 further including:

a battery for powering the processor, display, optical-disk drive, and memory device; and wherein the instructions for recording information indicative of a playback position are executed in response to a determination that the battery is low.

12. The system of claim 10 wherein the memory device comprises a hard drive.

13. A method of playing back data from an optical disk in a disk drive, the method comprising:
   playing back the optical disk;
   recording information indicative of a playback position on the optical disk; and
   communicating an optical disk position, based on the playback position indicated by the recorded information, to the disk drive, after a power-related interruption of the playing back of the optical disk;
   wherein said step of recording the information indicative of the playback position on the optical disk occurs prior to an event resulting in the power-related interruption of the playing back of the optical disk.

14. The method of claim 13 wherein the power-related interruption concerns loss of battery power, and wherein recording information indicative of a playback position on the optical disk occurs in response to a determination that available battery power is low.

15. The method of claim 13 wherein communicating the optical disk position to the optical disk drive occurs after outputting a prompt for a user directive to resume playback.

16. A method of playing back a movie on a battery-powered computer system, the method comprising:
   recording information indicating how much of the movie has been played; and
   after a battery-power-related interruption of movie playback, enabling resumption of the movie playback from a point of the movie based on the recorded information;
   wherein the battery-power-related interruption of the movie playback is based on insufficient battery power.

17. The method of claim 16 wherein recording information indicating how much of the movie has been played includes recording time information in a non-volatile memory.

18. The method of claim 16 wherein the movie is stored on an optical disk and the battery-powered computer system includes an optical-disk drive.

19. A computer system comprising:
   a processor;
   a first memory device for storing data transferred to the computer system;
   a battery coupled to supply power to the processor and the first memory device;
   a battery-monitoring circuit coupled to the battery for indicating a low-battery condition to the processor; and
   a second memory device responsive to the processor receiving an indication of a low-battery condition to store data indicating where to resume an interrupted data transfer to the first memory device.

20. The method of claim 3, further comprising:
   detecting a low-battery-power condition in the battery;
   wherein the step of recording the information indicating said disk playback position is performed in response to the step of detecting the low-battery-power condition.

21. The method of claim 1 wherein the interruption of power to the optical-disk drive occurs in response to a loss of sufficient AC power.

22. The method of claim 21 wherein the step of recording the information indicating said disk playback position is performed periodically, prior to said loss of sufficient AC power.

23. The method of claim 1 wherein said event leading to the interruption of power comprises a user connecting the computer system to another AC power outlet.

24. The computer-readable, data-storage medium of claim 7, further comprising:
   checking a status associated with a charge condition of a battery, wherein the step of recording the information indicative of the playback position occurs in response to a determination that the charge condition of the battery is low;
   wherein the event resulting in said power interruption comprises playing said data-retrieval device following the determination that the charge condition of the battery is low.

25. The computer-readable, data-storage medium of claim 7, wherein the step of recording the information indicative of the playback position is performed before an interruption to AC power.

26. The computer-readable, data-storage medium of claim 25, wherein the step of recording the information indicative of the playback position is performed periodically, prior to the interruption to the AC power.

27. The system of claim 10,
   wherein the power interruption is an interruption of AC power; and
   wherein said means for determining is configured to periodically determine the information indicative of a playback position of the optical-disk drive prior to the interruption to the AC power.

28. The method of claim 13 wherein the power-related interruption concerns an interruption of AC power.

29. The method of claim 27, wherein the step of recording the information indicative of the playback position on the optical disk is performed periodically, prior to the interruption to the AC power.

30. The method of claim 28, wherein the event resulting in the power-related interruption comprises an indication associated with a power switch being turned to an off position.

* * * * *